US012302085B2

(12) United States Patent
Chhabra et al.

(10) Patent No.: US 12,302,085 B2
(45) Date of Patent: May 13, 2025

(54) SPATIALIZED AUDIO CHAT IN A VIRTUAL METAVERSE

(71) Applicant: Roblox Corporation, San Mateo, CA (US)

(72) Inventors: Hitesh Chhabra, Fremont, CA (US); Philippe Clavel, Belmont, CA (US); Plamen Dragozov, Redwood City, CA (US); Jason Lawrence Golubock, Davis, CA (US); Palmer Noel Hogen, Glendale, CA (US); Sandeep Kanumuri, Redmond, WA (US); Pavel Pavlov, Bishkek (KG); Slawomir Strumecki, Vancouver (CA); Joshua Ray Taylor, San Mateo, CA (US); Frederick William Umminger, Oakland, CA (US)

(73) Assignee: Roblox Corporation, San Mateo, CA (US)

( * ) Notice: Subject to any disclaimer, the term of this patent is extended or adjusted under 35 U.S.C. 154(b) by 234 days.

(21) Appl. No.: 17/865,440

(22) Filed: Jul. 15, 2022

(65) Prior Publication Data

US 2023/0017111 A1 Jan. 19, 2023

Related U.S. Application Data

(60) Provisional application No. 63/222,304, filed on Jul. 15, 2021.

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01); *H04S 2400/11* (2013.01); *H04S 2400/15* (2013.01)

(58) Field of Classification Search
CPC ...... H04S 7/303; H04S 3/008; H04S 2400/01; H04S 2400/11; H04S 2400/15
(Continued)

(56) References Cited

U.S. PATENT DOCUMENTS

| | | | | |
|---|---|---|---|---|
| 2008/0234844 | A1 | 9/2008 | Boustead et al. | |
| 2015/0325226 | A1* | 11/2015 | Rosedale | G10H 1/0091 381/119 |
| 2019/0208345 | A1* | 7/2019 | Mindlin | H04R 5/04 |

FOREIGN PATENT DOCUMENTS

| | | |
|---|---|---|
| JP | 2007336481 | 12/2007 |
| JP | 2010122826 | 6/2010 |

OTHER PUBLICATIONS

USPTO, International Search Report for International Patent Application No. PCT/US2022/037236, Oct. 19, 2022, 2 pages.

(Continued)

*Primary Examiner* — Paul Kim
*Assistant Examiner* — Douglas J Suthers
(74) *Attorney, Agent, or Firm* — IP Spring

(57) ABSTRACT

Implementations described herein relate to methods, systems, and computer-readable media to provide spatialized audio in virtual experiences. The spatialized audio may be used in voice communications such as, for example, voice and/or video chats. The chats may include spatialized audio that is combined at a client device, or at an online experience platform, and is targeted to a particular user. Individual audio streams may be collected from a plurality of avatars and other objects, and combined based on the target user. The audio may also include background and/or ambient sounds to provide a rich, immersive audio stream in virtual experiences.

17 Claims, 9 Drawing Sheets

(58) Field of Classification Search
USPC .......................................................... 381/303
See application file for complete search history.

(56) References Cited

OTHER PUBLICATIONS

USPTO, Written Opinion for International Patent Application No. PCT/US2022/037236, Oct. 19, 2022, 6 pages.
"First Office Action in Korean Application No. 10-2024-7003111", Dec. 19, 2024, 8 pages.
JPO, Notice of Reasons for Rejection (with English translation) for Japanese Patent Application No. 2024-501886, Mar. 11, 2025, 10 pages.

* cited by examiner

SPATIALIZED AUDIO CHAT IN A VIRTUAL METAVERSE

CROSS-REFERENCE TO RELATED APPLICATIONS

The present application claims the benefit of priority to U.S. Provisional Patent Application No. 63/222,304, filed Jul. 15, 2021 and entitled SPATIALIZED AUDIO CHAT IN A VIRTUAL METAVERSE, the entire contents of which are hereby incorporated by reference herein.

TECHNICAL FIELD

Embodiments relate generally to audio output via a computer device, and more particularly, to methods, systems, and computer-readable media for providing spatialized audio in a virtual immersive environment such as a metaverse place of a virtual metaverse.

BACKGROUND

Computer audio (e.g., chat between users of computer devices) oftentimes consists of monaural or stereo audio being provided as it is received from a listening device or microphone. The provided audio is generally unfiltered or minimally filtered, and may sound sterile or direct, notwithstanding an actual virtual location of two avatars representing the users engaged in chat. It follows that as virtual experiences become more visually immersive, the simplistic nature of the provided audio becomes distracting and/or detracts from the immersive experience, e.g., causes a user to break away from the experience.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to providing spatialized audio in a virtual metaverse.

According to one aspect, a computer-implemented method of spatialized audio in a virtual metaverse is disclosed, comprising: receiving a request to receive audio associated with a metaverse place of the virtual metaverse from a first user of a plurality of users, wherein the first user is associated with a user device, and wherein the plurality of users are associated with a respective avatars of a plurality of avatars in the metaverse place; retrieving a data model associated with the metaverse place, wherein the data model includes one or more spatial parameters representative of one or more physical laws that apply to the metaverse place; extracting avatar information and scene information from the data model, wherein the avatar information includes one or more of: position, velocity, or direction of the plurality of avatars in the metaverse place including a first avatar associated with the first user, and wherein the scene information includes one or more of: occlusions, reverberations, or virtual walls in virtual proximity to the first avatar in the metaverse place; transforming respective audio streams received from each user of the plurality of users based on the avatar information and the scene information, and one or more audio characteristics of at least one of the respective audio streams based on the one or more spatial parameters to create spatialized audio streams; combining the spatialized audio streams to create a combined spatialized audio stream; and providing the combined spatialized audio stream to the user device.

Various implementations of the computer-implemented method are described herein.

In some implementations, the spatial parameters include a distance decay parameter to attenuate audio based on distance between avatars.

In some implementations, the respective audio stream received from each user of the plurality of users comprises monaural audio received at a microphone device and wherein the combined spatialized audio stream comprises stereo audio.

In some implementations, the combined spatialized audio stream comprises stereo audio is generated by positioning each user's monaural audio at a location of the respective user's avatar.

In some implementations, the combined spatialized audio stream comprises spatial audio based on the audio streams received from users of the plurality of users other than the first user and background audio, wherein the background audio is generated based upon one or more of: audio received from other users distinct from the first user; and audio generated based on movement of avatars within the metaverse place.

In some implementations, the computer-implemented method further comprises: determining a set of prioritized audio streams received from each user of the plurality of users, wherein transforming respective audio streams further comprises transforming the set of prioritized audio streams to create the spatialized audio streams.

In some implementations, determining the set of prioritized audio streams comprises: prioritizing audio streams received from each user of the plurality of users based on one or more of: proximity of avatars in the metaverse place, velocity of avatars in the metaverse place, direction of avatars in the metaverse place, virtual objects in proximity to avatars within the metaverse place, capabilities of the user device, or user preferences of the first user.

In some implementations, audio streams associated with avatars that are closer to a receiving avatar are prioritized over audio streams associated with avatars that are further away from the receiving avatar, wherein audio streams associated with avatars oriented towards a receiving avatar are prioritized over audio streams associated with avatars oriented away from a receiving avatar, and wherein audio streams associated with avatars that are moving towards a receiving avatar are prioritized over audio streams associated with avatars that are moving away from a receiving avatar.

According to another aspect, a computer-implemented method of providing spatialized audio in a virtual metaverse is disclosed, comprising: receiving a request to receive audio associated with a metaverse place of the virtual metaverse from a first user of a plurality of users, wherein the first user is associated with a user device, and wherein the plurality of users are associated with a respective avatars of a plurality of avatars in the metaverse place; determining a set of prioritized audio streams received from each user of the plurality of users; transforming the set of prioritized audio streams to create spatialized audio streams; combining the spatialized audio streams to create a combined spatialized audio stream; and providing the combined spatialized audio stream to the user device.

Various implementations of the computer-implemented method are described herein.

In some implementations, determining the set of prioritized audio streams comprises: prioritizing audio streams received from each user of the plurality of users based on one or more of: proximity of avatars in the metaverse place, velocity of avatars in the metaverse place, direction of avatars in the metaverse place, virtual objects in proximity to avatars within the metaverse place, capabilities of the user device, or user preferences of the first user.

In some implementations, audio streams associated with avatars that are closer to a receiving avatar are prioritized over audio streams associated with avatars that are further away from the receiving avatar, wherein audio streams associated with avatars oriented towards a receiving avatar are prioritized over audio streams associated with avatars oriented away from a receiving avatar, and wherein audio streams associated with avatars that are moving towards a receiving avatar are prioritized over audio streams associated with avatars that are moving away from a receiving avatar.

According to another aspect, a system is disclosed, comprising: a memory with instructions stored thereon; and a processing device, coupled to the memory, the processing device configured to access the memory, wherein the instructions when executed by the processing device, cause the processing device to perform operations including: receiving a request to receive audio associated with a metaverse place of the virtual metaverse from a first user of a plurality of users, wherein the first user is associated with a user device, and wherein the plurality of users are associated with a respective avatars of a plurality of avatars in the metaverse place; retrieving a data model associated with the metaverse place, wherein the data model includes one or more spatial parameters representative of one or more physical laws that apply to the metaverse place; extracting avatar information and scene information from the data model, wherein the avatar information includes one or more of: position, velocity, or direction of the plurality of avatars in the metaverse place including a first avatar associated with the first user, and wherein the scene information includes one or more of: occlusions, reverberations, or virtual walls in virtual proximity to the first avatar in the metaverse place; transforming respective audio streams received from each user of the plurality of users based on the avatar information and the scene information, and one or more audio characteristics of at least one of the respective audio streams based on the one or more spatial parameters to create spatialized audio streams; combining the spatialized audio streams to create a combined spatialized audio stream; and providing the combined spatialized audio stream to the user device.

Various implementations of the system are described herein.

In some implementations, the spatial parameters include a distance decay parameter to attenuate audio based on distance between avatars.

In some implementations, the respective audio stream received from each user of the plurality of users comprises monaural audio received at a microphone device and wherein the combined spatialized audio stream comprises stereo audio.

In some implementations, the combined spatialized audio stream comprises stereo audio is generated by positioning each user's monaural audio at a location of the respective user's avatar.

In some implementations, the combined spatialized audio stream comprises spatial audio based on the audio streams received from users of the plurality of users other than the first user and background audio, wherein the background audio is generated based upon one or more of: audio received from other users distinct from the first user; and audio generated based on movement of avatars within the metaverse place.

In some implementations, the operations further comprise: determining a set of prioritized audio streams received from each user of the plurality of users, wherein transforming respective audio streams further comprises transforming the set of prioritized audio streams to create the spatialized audio streams.

In some implementations, determining the set of prioritized audio streams comprises: prioritizing audio streams received from each user of the plurality of users based on one or more of: proximity of avatars in the metaverse place, velocity of avatars in the metaverse place, direction of avatars in the metaverse place, virtual objects in proximity to avatars within the metaverse place, capabilities of the user device, or user preferences of the first user.

In some implementations, audio streams associated with avatars that are closer to a receiving avatar are prioritized over audio streams associated with avatars that are further away from the receiving avatar, wherein audio streams associated with avatars oriented towards a receiving avatar are prioritized over audio streams associated.

In some implementations, the system further comprising: a spatialized audio manager configured to transform the respective audio streams received from each user of the plurality of users; and an audio device override module configured to disable non-spatialized audio at the user device prior to providing the combined spatialized audio stream to the user device.

According to another aspect, a non-transitory computer-readable medium is provided. The non-transitory computer-readable medium with instructions stored thereon that, responsive to execution by a processing device, causes the processing device to perform operations comprising: retrieving a data model associated with a metaverse place of the virtual metaverse, wherein the data model includes one or more spatial parameters representative of a group of physical laws that apply to the metaverse place; receiving a request to join the metaverse place from a first user of a plurality of users, wherein the first user is associated with a first avatar and a user device, and wherein the plurality of users are associated with a plurality of avatars in the metaverse place; extracting avatar information and scene information from the data model responsive to the request, wherein the avatar information includes one or more of: position, velocity, or direction of the first avatar and the plurality of avatars in the metaverse place, and wherein the scene information includes one or more of: occlusions, reverberations, or virtual walls in virtual proximity to the first avatar; transforming, using the spatial parameters, respective audio streams received from each user of the plurality of users based on the avatar information and the scene information, wherein the transforming includes modifying one or more audio characteristics to create spatialized audio streams; combining the spatialized audio streams to create a combined spatialized audio stream; and providing the combined spatialized audio stream to the user device.

Various implementations of the non-transitory computer-readable medium are described herein.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
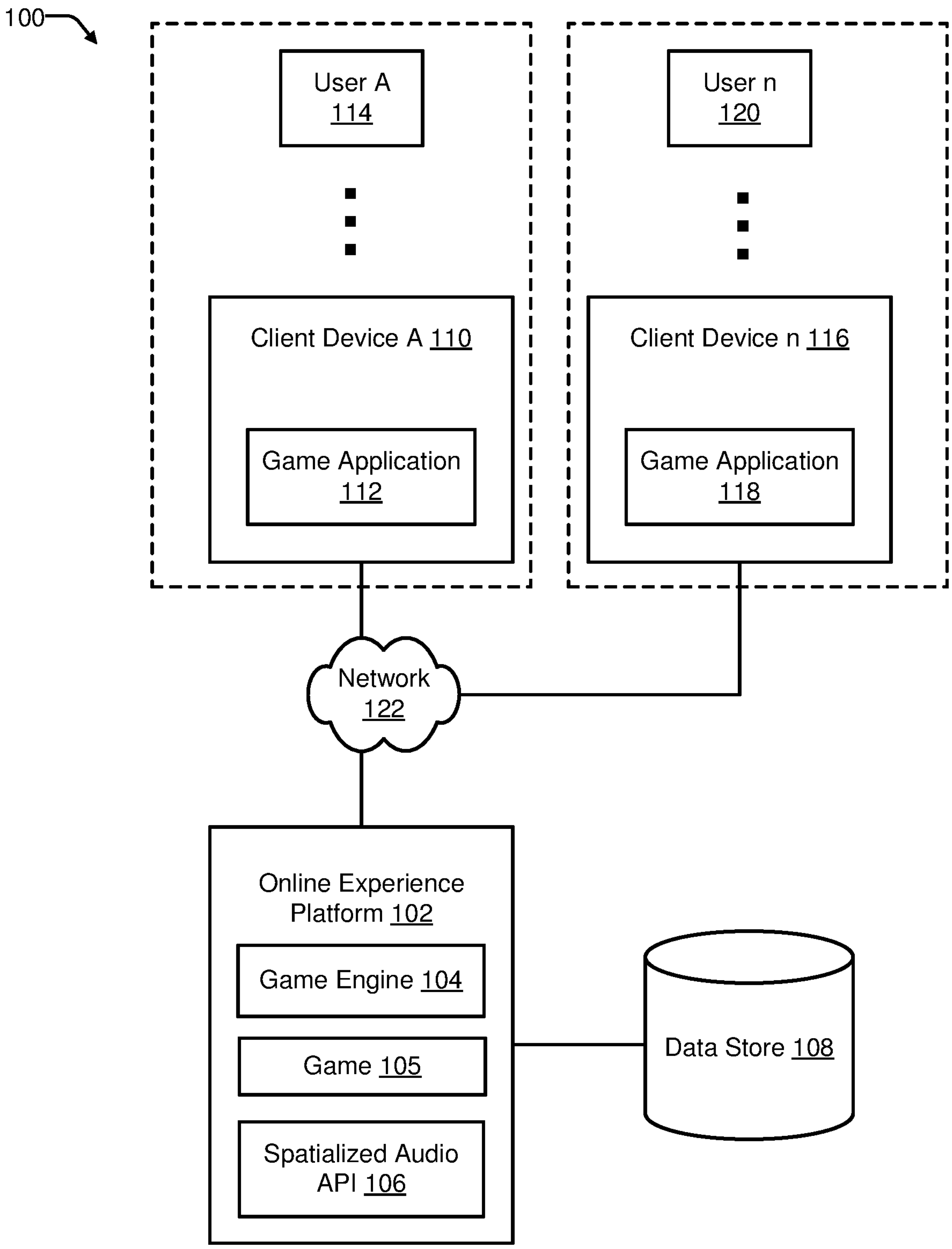
FIG. 1 is a diagram of an example network environment for providing spatialized audio chat in a virtual metaverse, in accordance with some implementations.

One or more implementations described herein relate to spatialized audio associated with an online gaming platform. Features can include automatically prioritizing spatialized audio streams, as well as providing spatialized audio, based on position, velocity, and/or other factors related to virtual objects, avatars, and other items in a metaverse place of a virtual metaverse.

Features described herein provide spatialized audio for output at client devices connected to an online platform, such as, for example, an online experience platform or an online gaming platform. The online platform may provide a virtual metaverse having a plurality of metaverse places associated therewith. Virtual avatars associated with users can traverse and interact with the metaverse places, as well as items, characters, other avatars, and objects within the metaverse places. The avatars can move from one metaverse place to another metaverse place, while experiencing spatialized audio that provides for a more immersive and enjoyable experience. Spatialized audio streams from a plurality of users (e.g., or avatars associated with a plurality of users) can be prioritized based on many factors, such that rich audio can be provided while taking into consideration position, velocity, movement, and actions of avatars and characters, as well as bandwidth, processing, and other capabilities of the client devices.

Through prioritizing and combining different audio streams, a combined spatialized audio stream can be provided for output at a client device that provides a rich user experience, reduced number of computations for providing the spatialized audio, as well as reduced bandwidth while not detracting from the virtual, immersive experience. Additionally, a spatial audio application programming interface (API) is defined that enables users and developers to implement spatialized audio for almost any online experience, thereby allowing production of high quality online virtual experiences, games, metaverse places, and other interactions that have immersive audio while requiring reduced technical proficiency of users and developers.

Online experience platforms and online gaming platforms (also referred to as "user-generated content platforms" or "user-generated content systems") offer a variety of ways for users to interact with one another. For example, users of an online experience platform may create games or other content or resources (e.g., characters, graphics, items for game play and/or use within a virtual metaverse, etc.) within the online platform.

Users of an online experience platform may work together towards a common goal in a metaverse place, game, or in game creation; share various virtual items (e.g., inventory items, game items, etc.), engage in audio chat (e.g., spatialized audio chat), send electronic messages to one another, and so forth. Users of an online experience platform may interact with others and play games, e.g., including characters (avatars) or other game objects and mechanisms. An online experience platform may also allow users of the platform to communicate with each other. For example, users of the online experience platform may communicate with each other using voice messages (e.g., via voice chat with spatialized audio), text messaging, video messaging (e.g., including spatialized audio), or a combination of the above. Some online experience platforms can provide a virtual three-dimensional environment or multiple environments linked within a metaverse, in which users can interact with one another or play an online game.

In order to help enhance the entertainment value of an online experience platform, the platform can provide rich audio for playback at a user device. The audio can include, for example, different audio streams from different users, as well as background audio. According to various implementations described herein, the different audio streams can be transformed into spatialized audio streams. The spatialized audio streams may be combined, for example, to provide a combined spatialized audio stream for playback at a client device. Furthermore, prioritized audio streams may be provided such that bandwidth is reduced while still providing immersive, spatialized audio. Moreover, background audio streams may be combined with the spatialized audio, such that realistic background noise/effects are also played back to users. Even further, characteristics of a metaverse place, such as surrounding mediums (air, water, other, etc.), reverberations, reflections, aperture sizes, wall density, ceiling height, doorways, hallways, object placement, non-player objects/characters, and other characteristics are utilized in creating the spatialized audio and/or the background audio to increase realism and immersion within the online virtual experience.

Figure 2A:
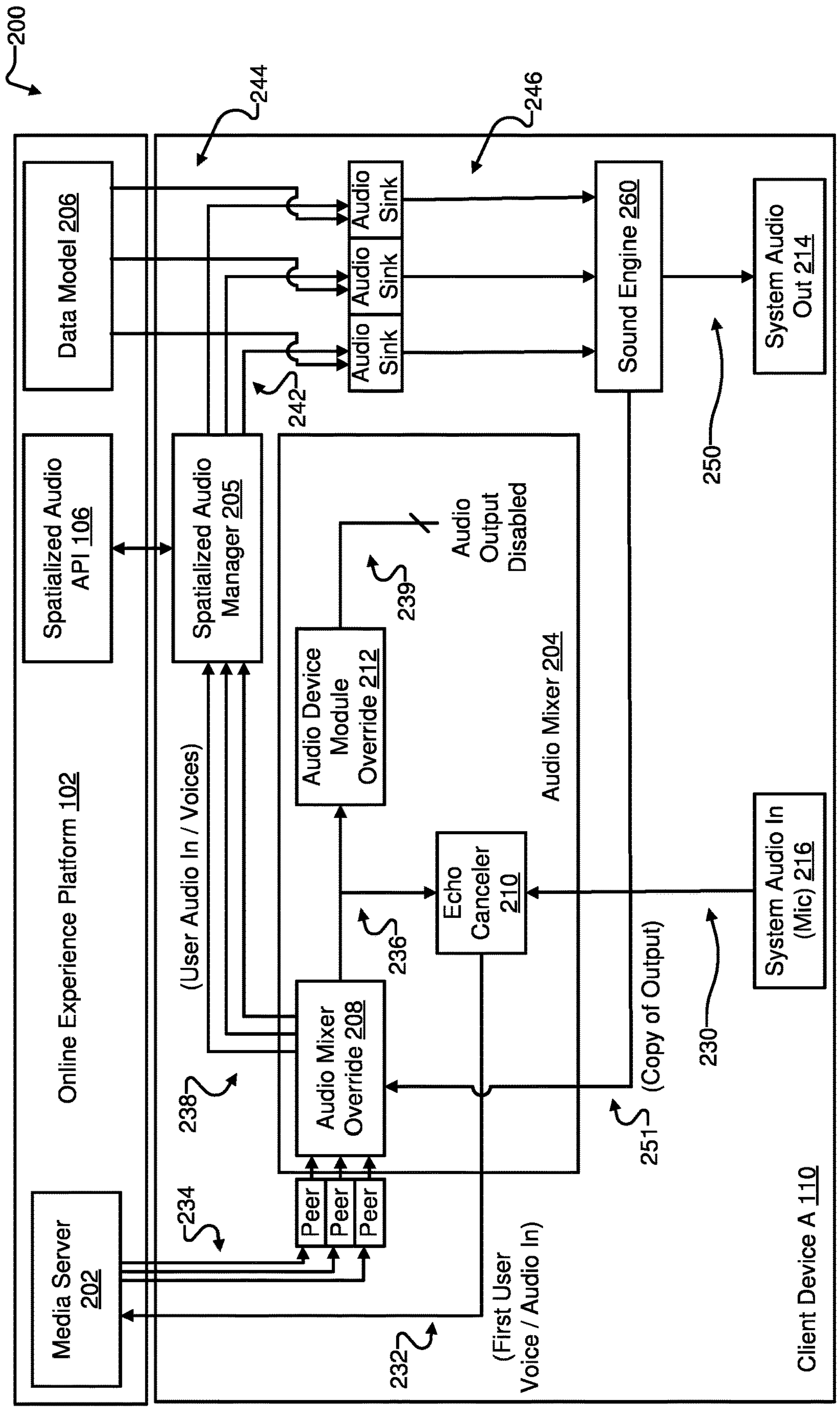
FIG. 2A is a diagram of an example network environment for providing spatialized audio chat in a virtual metaverse, in accordance with some implementations.
Figure 2B:
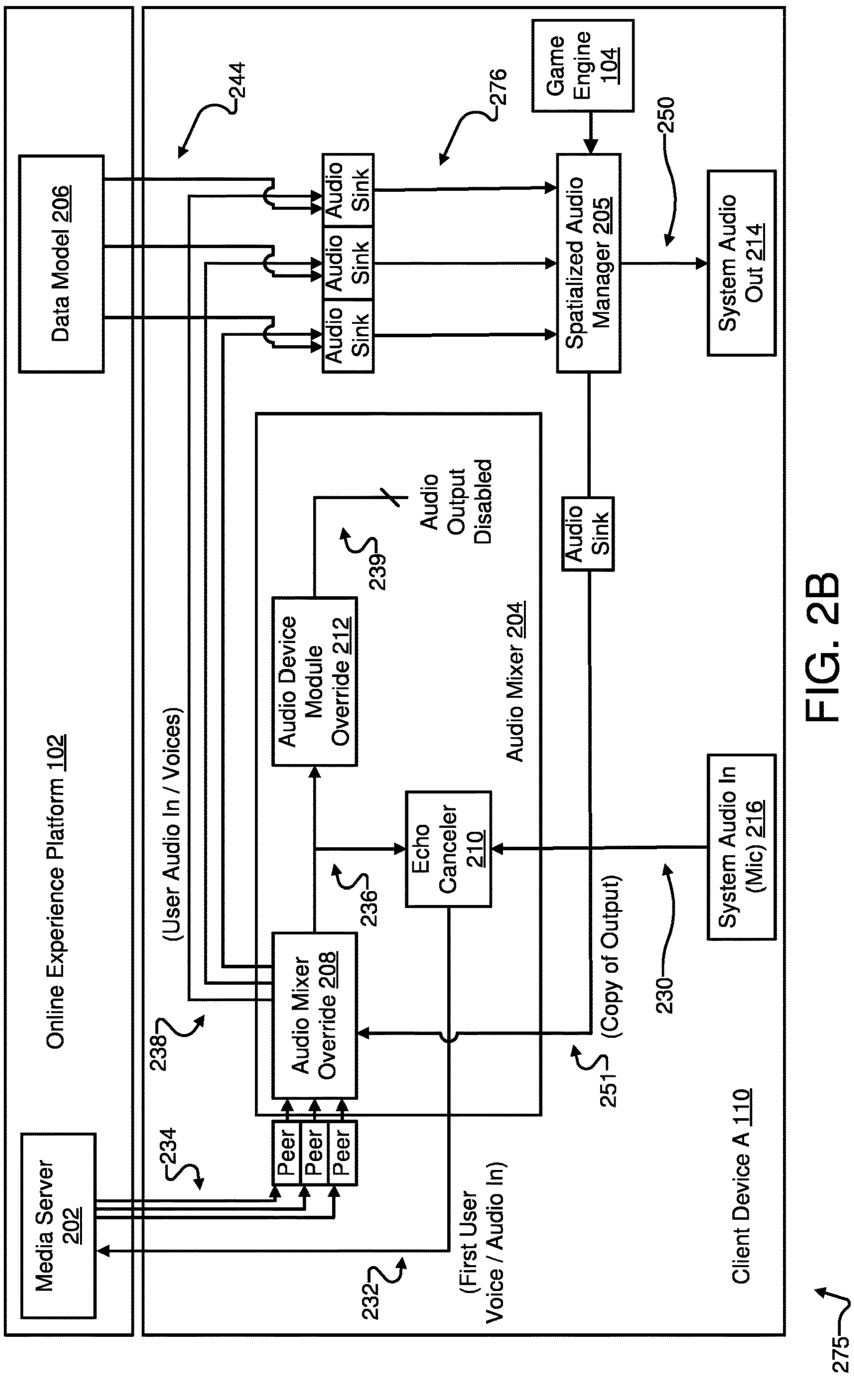
FIG. 2B is a diagram of an example network environment for providing spatialized audio chat in a virtual metaverse, in accordance with some implementations
Figure 3:
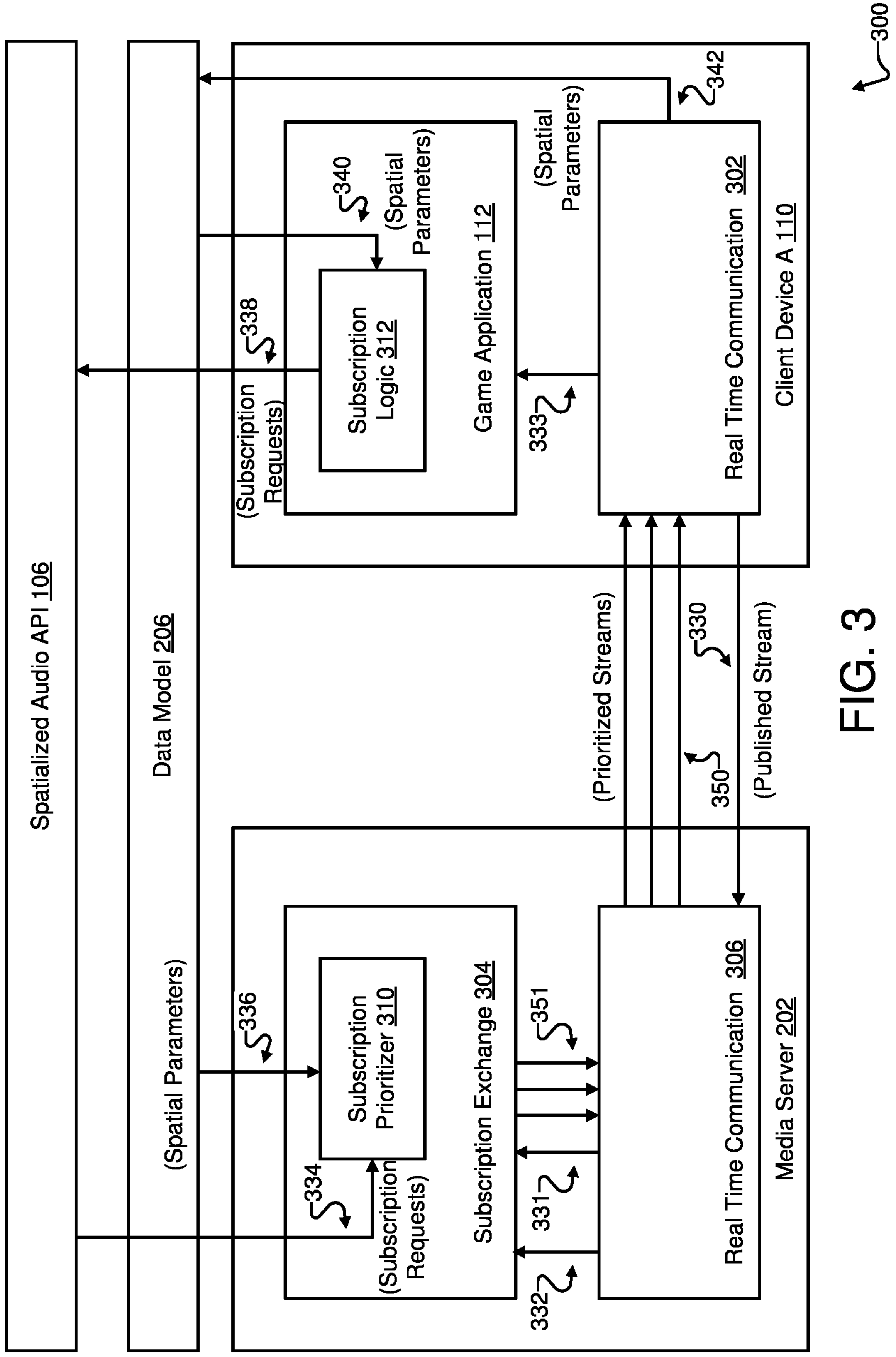
FIG. 3 is a diagram of an example network environment for prioritizing spatialized audio streams in a virtual metaverse, in accordance with some implementations.

FIGS. 1-3: System Architecture

FIG. 1 illustrates an example network environment 100, in accordance with some implementations of the disclosure. The network environment 100 (also referred to as "system" herein) includes an online experience platform 102, a first client device 110, a second client device 116 (generally referred to as "client devices 110/116" herein), all connected via a network 122. The online experience platform 102 can include, among other things, a game engine 104, one or more games 105, a spatialized audio API 106, and a data store 108. The client device 110 can include a game application 112, and the client device 116 can include a game application 118. Users 114 and 120 can use client devices 110 and 116, respectively, to interact with the online experience platform 102 and with other users utilizing the online experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online experience platform 102 can include a server having one or more computing devices (e.g., a cloud computing system, a rackmount server, a server computer, cluster of physical servers, virtual server, etc.). In some implementations, a server may be included in the online experience platform 102, be an independent system, or be part of another system or platform.

In some implementations, the online experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online experience platform 102 and to provide a user with access to online experience platform 102. The online experience platform 102 may also include a website (e.g., one or more webpages) or application back-end software that may be used to provide a user with access to content provided by online experience platform 102. For example, users 114/120 may access online experience platform 102 using the game application 112/118 on client devices 110/116, respectively.

In some implementations, online experience platform 102 may include a type of social network providing connections between users or a type of user-generated content system that allows users (e.g., end-users or consumers) to communicate with other users via the online experience platform 102, where the communication may include voice chat (e.g., synchronous and/or asynchronous voice communication with or without spatialized audio), video chat (e.g., synchronous and/or asynchronous video communication with or without spatialized audio), or text chat (e.g., synchronous and/or asynchronous text-based communication).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online experience platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," "metaverse place," or "virtual experiences" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game. Similarly, some users may engage in real-time voice or video chat with other users of the game. As described herein, the real-time voice or video chat may include spatialized audio.

In some implementations, other collaboration platforms can be used with the features described herein instead of or in addition to online experience platform 102 and/or spatialized audio API 106. For example, a social networking platform, purchasing platform, messaging platform, creation platform, etc. can be used with the spatial audio features such that immersive spatialized audio is provided to users outside of games.

In some implementations, gameplay may refer to interaction of one or more players using client devices (e.g., 110 and/or 116) within a game (e.g., 105) or the presentation of the interaction on a display or other output device of a client device 110 or 116. In some implementations, gameplay instead refers to interaction within a virtual experience or metaverse place, and may include objectives that are dissimilar, different, or the same as some games. Furthermore, although referred to as "players," the terms "avatars," "users," and/or other terms may be used to refer to users engaged with and/or interacting with an online virtual experience.

One or more games 105 are provided by the online experience platform. In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the virtual environments of a game 105 share the common set of rules or common goal. In some implementations, different games may have different rules or goals from one another. It is noted that although referred to specifically as "games," or game-related, the game application 112/118, game 105, and game engine 104 may also be referred to as a virtual experience application 112/118, virtual experience 105, and/or virtual experience engine 104.

In some implementations, games and/or virtual experiences may have one or more environments (also referred to as "gaming environments," "metaverse places," or "virtual environments" herein) where multiple environments may be linked. An example of an environment may be a three-dimensional (3D) environment. The one or more environments of a game 105 or virtual experience may be collectively referred to as a "world," "gaming world," "virtual world," "universe," or "metaverse" herein. An example of a world may be a 3D metaverse place of a game 105. For example, a user may build a metaverse place that is linked to another metaverse place created by another user, different from the first user. A character of the virtual experience may cross the virtual border to enter the adjacent metaverse place. Additionally, sounds, theme music, and/or background music may also traverse the virtual border such that avatars standing within proximity of the virtual border may listen to spatialized audio that includes at least a portion of the sounds emanating from the adjacent metaverse place. In this manner, spatialized audio may enable a fully immersive experience that includes virtual audio representative of similarities in sound propagation to that of a real world environment.

It may be noted that 3D environments or 3D worlds use graphics that use a three-dimensional representation of geometric data representative of content (or at least present content to appear as 3D content whether or not 3D representation of geometric data is used). 2D environments or 2D worlds use graphics that use two-dimensional representation of geometric data representative of game content.

In some implementations, the online experience platform 102 can host one or more games 105 and can permit users to interact with the games 105 (e.g., search for games, game-related content, or other content) using a game application 112/118 of client devices 110/116. Users (e.g., 114 and/or 120) of the online experience platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others.

In some implementations, users may buy, sell, or trade game virtual game objects, such as in-platform currency (e.g., virtual currency), with other users of the online experience platform 102. In some implementations, online experience platform 102 may transmit game content to game applications (e.g., 112). In some implementations, game content (also referred to as "content" herein) may refer to any data or software instructions (e.g., game objects, game, user information, video, images, commands, media items, etc.) associated with online experience platform 102 or game applications.

In some implementations, game objects (e.g., also referred to as "item(s)" or "objects" or "virtual game item(s)" herein) may refer to objects that are used, created, shared or otherwise depicted in game applications 105 of the online experience platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online experience platform 102 hosting games 105, is provided for purposes of illustration, rather than limitation. In some implementations, online experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online experience platform 102 (e.g., a public game). In some implementations, where online experience platform 102 associates one or more games 105 with a specific user or group of users, online experience platform 102 may associated the specific user(s) with a game 105 using user account information (e.g., a user account identifier such as username and password). Similarly, in some implementations, online experience platform 102 may associate a specific developer or group of developers with a game 105 using developer account information (e.g., a developer account identifier such as a username and password).

In some implementations, online experience platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, spatialized audio manager/engine, audio mixers, audio subscription exchange, audio subscription logic, audio subscription prioritizers, real-time communication engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) and transform audio (e.g., transform monaural or stereo sounds into spatialized audio streams, etc.). In some implementations, game applications 112/118 of client devices 110/116, respectively, may work independently, in collaboration with game engine 104 of online experience platform 102, or a combination of both.

In some implementations, both the online experience platform 102 and client devices 110/116 execute a game engine (104, 112, and 118, respectively). The online experience platform 102 using game engine 104 may perform some or all the game engine functions (e.g., generate physics commands, rendering commands, spatialized audio commands, etc.), or offload some or all the game engine functions to game engine 104 of client device 110. In some implementations, each game 105 may have a different ratio between the game engine functions that are performed on the online experience platform 102 and the game engine functions that are performed on the client devices 110 and 116.

For example, the game engine 104 of the online experience platform 102 may be used to generate physics commands in cases where there is a collision between at least two game objects, while the additional game engine functionality (e.g., generate rendering commands or combining spatialized audio streams) may be offloaded to the client device 110. In some implementations, the ratio of game engine functions performed on the online experience platform 102 and client device 110 may be changed (e.g., dynamically) based on gameplay conditions. For example, if the number of users participating in gameplay of a game 105 exceeds a threshold number, the online experience platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online experience platform 102. Subsequent to receiving control instructions from the client devices 110 and 116, the online experience platform 102 may send gameplay instructions (e.g., position and velocity information of the characters participating in the group gameplay or commands, such as rendering commands, collision commands, spatialized audio commands, etc.) to the client devices 110 and 116 based on control instructions. For instance, the online experience platform 102 may perform one or more logical operations (e.g., using game engine 104) on the control instructions to generate gameplay instruction for the client devices 110 and 116. In other instances, online experience platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116. The client devices 110 and 116 may also use the gameplay instructions to create, modify, and/or combine spatialized audio streams for output at audio output devices of client devices 110 and 116

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online experience platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.). As described in more detail herein, character position and velocity information may be used to determine an appropriate head-related transfer function (HTRF) associated with another character, such that a spatialized audio stream can be created for that another character that is representative of sound propagation in the real world. The associated HRTF, position information, velocity information, Baum-Welch (BW) algorithm data, virtual auditory display (VAD) data, and/or other data may be stored in the data store 108 by the online experience platform 102.

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., head, hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online experience platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online experience platform 102 may store characters created by users in the data store 108. In some implementations, the online experience platform 102 maintains a character catalog and game catalog that may be presented to users via the game engine 104, game 105, and/or client device 110/116. In some implementations, the game catalog includes images of games stored on the online experience platform 102. In addition, a user may select a character (e.g., a character created by the user or other user) from the character catalog to participate in the chosen game. The character catalog includes images of characters stored on the online experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online experience platform 102, such as search for a game, experience, or other content; control a virtual character in a virtual experience hosted by online experience platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online experience platform 102. The game application may render, display, or present the content (e.g., a web page, a user interface, a media viewer, an audio stream) to a user. In an implementation, the game application may also include an embedded media player that is embedded in a web page.

According to aspects of the disclosure, the game application 112/118 may be an online experience platform application for users to build, create, edit, upload content to the online experience platform 102 as well as interact with online experience platform 102 (e.g., play games 105 hosted by online experience platform 102). As such, the game application 112/118 may be provided to the client device 110 or 116 by the online experience platform 102. In another example, the game application 112/118 may be an application that is downloaded from a server.

In some implementations, a user may login to online experience platform 102 via the game application. The user may access a user account by providing user account information (e.g., username and password) where the user account is associated with one or more characters available to participate in one or more games 105 of online experience platform 102.

In general, functions described as being performed by the online experience platform 102 can also be performed by the client device(s) 110 or 116, or a server, in other implementations if appropriate. In addition, the functionality attributed to a particular component can be performed by different or multiple components operating together. The online experience platform 102 can also be accessed as a service provided to other systems or devices through appropriate application programming interfaces (APIs), and thus is not limited to use in websites.

In some implementations, online experience platform 102 may include a spatialized audio API 106. In some implementations, the spatialized audio API 106 may be a suite of computer-executable code that provides functionality to users and/or developers in the form of function calls that allow software components to communicate and/or provide/receive data. The spatialized audio API includes a plurality of defined software functions that are related to spatialized audio, which can be used by developers to enable spatialized audio functionality in user-created content, and can include any function related to audio playback at a user device.

In at least one implementation, the spatialized audio API 106 includes a number of functions, events, and properties that enable spatialized audio. For example, the spatialized audio API 106 can include functions including creating and destroying a voice channel. These functions may enable the creation of a new voice channel associated with a specific server and/or creating a global voice channel that is shared between servers of a same metaverse place. The functions may also enable the deletion/destruction of a previously created voice channel.

The spatialized audio API 106 can also include functions including adding and removing players, as well as retrieving players associated with a voice channel. These functions may enable adding a given player or players to specific voice channels, removing players from specific voice channels, and/or retrieving lists of players associated with voice channels in a metaverse place. In some implementations, events may be triggered by these functions such that events are fired when players join a voice channel and/or leave a voice channel.

The spatialized audio API 106 can also include functions including creating voice channels that are not associated with particular players. In this manner, these functions can enable non-player characters, objects, and other virtual items to emit sound to be used in spatialized audio streams. For example, a speaker object can be created that emits sounds as though a representing a functioning juke box having a particular position within a metaverse place. Thereafter, avatars in the vicinity of the speaker object may receive spatialized audio streams that include a transformed audio stream that includes sounds from the speaker object. The sounds created by non-player characters, objects, and other virtual items may also be incorporated into a background audio stream. This background audio stream can also include sounds created by several (e.g., one or more) other avatars or player characters, as well.

The spatialized audio API 106 can also include properties including parameters or properties associated with sound propagation. In this manner, the properties can include properties such as: propagation medium (e.g., water, air, other, etc.), audio source (e.g., a player or non-player audio source), audio volume (e.g., representative of volume of an audio source), attenuation distance (e.g., distance at which sound begins to attenuate), maximum distance sound can be heard (e.g., if an avatar is beyond this distance, this audio stream will not be included in spatialized combinations), linear or logarithmic sound roll off (e.g., for a particular roll off mode), playback loudness, connection state (e.g., of voice channels), mute state (e.g., if a player or sound source is muted), and other properties.

The spatialized audio API 106 can further include additional functions, variables, properties, and/or parameters that enable rich, immersive spatialized audio to be used in user-created content and/or games. Hereinafter, operation of the online experience platform 102 with regard to providing spatialized audio (or combined spatialized audio streams), utilizing the spatialized audio API 106, is described more fully with reference to FIG. 2A and FIG. 2B.

FIG. 2A is a diagram of an example network environment 200 (e.g., a subset of the network environment 100) for providing spatialized audio chat in a virtual metaverse, in accordance with some implementations. Network environment 200 is provided for illustration. In some implementations, the network environment 200 may include the same, fewer, more, or different elements configured in the same or different manner as that shown in FIG. 2A.

As shown in FIG. 2A, the online experience platform 102 may be in communication with client device 110 (e.g., over network 122, not illustrated) such that a user audio stream 232 is received from the client device 110 (e.g., signal 230 from system audio in 216), and a combined spatialized audio stream 250 is provided for output at the client device 110 (e.g., through system audio out 214).

The online experience platform 102, in addition to those components illustrated in FIG. 1, may include a media server 202 and a data model 206. The client device 110, in addition to those components illustrated in FIG. 1, may include an audio mixer 204, a spatialized audio manager 205, and a sound engine 260.

Generally, the media server 202 is a purpose-built logical server configured to connect and communication audio streams (or other data) between components of the network environment 100. The media server 202 may facilitate real-time communication, for example, between client devices and the online gaming server 102, and vice versa.

The audio mixer 204 may be a software module configured to extract audio streams from multiple players or non-player objects for transformation into spatialized audio streams. The audio mixer 204 may include an audio mixer override component 208, an echo cancelling component 210, and/or an audio device module override component 212.

The audio mixer override component 208 may be configured to override basic audio provided by the online experience platform 102 such that spatialized audio is enabled. For example, the audio mixer override component 208 may receive a copy 251 of spatialized audio output 250 as well as user audio streams 234, and provide individual audio streams 238 to the spatialized audio manager 205, and typical audio stream 236, as outputs. In this manner, if the audio mixer override component 208 is not initialized, the client device 110 may function to provide regular, non-spatialized audio 239. Similarly, if the audio mixer override component is initialized (e.g., spatialized audio is enabled at the online experience platform 102 or at the client device 110 for a particular game 105), individual audio streams 238 for spatialization transformation are provided to the spatialized audio manager 205.

The echo cancelling component 210 may be configured to cancel echo and/or other undesirable sound artifacts from audio streams. A filtered output 232 (e.g., echo-cancelled based on audio stream 236) may be provided from the echo cancelling component 210 to the media server 202. In this manner, the echo cancelling component 210 may establish filters or other functionality to aid in providing high quality audio streams.

The audio device module override component 212 may be configured to override and/or disable system audio output for the client device 110, such that spatialized audio is output instead of standard system audio (e.g., if spatialized audio for the online experience platform 102 or client device 110 is not enabled). The audio device module override component 212 may otherwise output regular audio 239 when spatialized audio is not enabled.

The spatialized audio manager 205 may be a software component configured to input one or more user audio streams 238 and transform the streams into spatialized audio streams 242, using the spatialized audio API 106 and associated software functions. For example, the spatialized audio manager 205 may transform each individual user audio stream 238 into a new, individual spatialized audio stream 242. Alternatively, the spatialized audio manager 205 may provide individual user audio streams 238 to another component for spatialization transformation at the client device 110.

Additionally, each individual user audio stream 238 may also be used to bolster physics commands and/or action commands associated with respective avatars. In this manner, each individual user audio stream 238 can be used to implement facial animation that is synchronized with the audio to create a more realistic and/or immersive experience for users. For example, as the facial animation is synchronized to spatialized audio, attenuation due to distance is realized while also having visible face movement that allow a user to identify the avatar that is producing the sounds, thereby further enhancing the user experience. Similarly, individual audio streams 238 and/or spatialized audio streams 242 may be interpreted to extract emotion and/or intent. In this manner, facial animations can be extracted for further enhancement of the user experience.

Additionally, each individual user audio stream 238 can be used for moderation of users on the online experience platform 102. For example, as each individual audio stream is already separate, abusive or foul language can be more easily associated with the associated user. Thereafter, a "mute" function or remove from voice channel function call (through API 106) may be used to effectively moderate the user associated with the abusive behavior. The moderation may be extensible and/or adaptable to machine learning techniques to allow an automatic moderation tool to analyze vocal behaviors, inflections, screaming, and/or utilize natural language processing techniques to identify abusive behavior and auto-moderate the associated users.

The data model 206 may include a plurality of spatial parameters related to audio transformation. For example, the data model 206 may include one or more spatial parameters representative of a group of physical laws that apply to the metaverse place. The physical laws may represent or mimic a real world sound propagation environment, may represent an exaggerated real world sound propagation environment, and/or may represent a newly defined sound propagation environment. Sound propagation parameters may be defined through the exposed spatialized audio API 106, by developers assigning particular values to parameters. For example, different propagation mediums, roll off audio parameters, distance attenuation functionality/parameters, and/or reflective parameters may be defined. Similarly, volume parameters, minimum/maximum audible parameters, and/or propagation parameters may be defined.

The data model 206 may also include avatar and/or scene information provided by a developer and the actual positioning of avatars within a metaverse place. The avatar information can include one or more of: position, velocity, or direction of avatars in the metaverse place. The scene information can include one or more of: occlusions, reverberations, virtual objects, non-player objects, openings, orifices, reflective surfaces, virtual ceilings, virtual floors, virtual hallways, virtual doorways, and/or virtual walls in virtual proximity to avatars within the metaverse place. The scene information may also include information related to a medium (e.g., water, air, other, etc.) of a surrounding environment. This information/data may be separated based on each avatar in the metaverse place (e.g., as individualized spatial, avatar, and scene information signals 244) and provided for transformation by the spatialized audio manager 205 and/or a respective client device 110/116.

Thereafter, a plurality of spatialized audio streams 246 may be combined into a combined spatialized audio stream 250 by a sound engine 260 (or alternatively, the spatialized audio manager 205 and/or the game engine 104) for output at the client device 110. The sound engine 260 may include any suitable sound engine, including a sound effects engine and/or a portion of the game engine 104 dedicated to audio effects. In at least one implementation, the sound engine 260 is a proprietary audio effects engine. In other implementations, the sound engine 260 may be a digital effects engine or a game engine.

Hereinafter, an alternate network environment 275 is described with reference to FIG. 2B. FIG. 2B is a diagram of an example network environment 275 (e.g., a subset of the network environment 100) for providing spatialized audio chat in a virtual metaverse, in accordance with some implementations. Network environment 275 is provided for illustration. In some implementations, the network environment 275 may include the same, fewer, more, or different elements configured in the same or different manner as that shown in FIG. 2B.

As shown in FIG. 2B, the online experience platform 102 may be in communication with client device 110 (e.g., over network 122, not illustrated) such that the user audio stream 232 is received from the client device 110 (e.g., signal 230 from system audio in 216), and the combined spatialized audio stream 250 is provided for output at the client device 110 (e.g., through system audio out 214). It is noted that components and/or portions of the network environment 275 with the same numbering as those of network environment 200 are not repetitively described herein for the sake of brevity.

The online experience platform 102, similar to that illustrated in FIG. 2A, may include the media server 202 and data model 206. The client device 110, similar to that illustrated in FIG. 2A, may include the audio mixer 204 and spatialized audio manager 205. However, in contrast to the arrangement of FIG. 2A, the spatialized audio manager 205 may provide output 250 according to data received from the game engine 104, individual audio streams 238, and individualized spatial, avatar, and scene information signals 244 (e.g., combined signals 276). In this manner, the spatialized audio manager 205 may include sound engine functionality embedded or implemented therein. Alternatively, a standalone sound engine component or components may be used to provide spatialized audio output 250.

In this manner, the spatialized audio manager 205 provides the combined, spatialized audio stream 250 based upon data received from the game engine 104 as well as the data model 206. For example, the spatialized audio manager 205 may receive each individual user audio stream 238 as a new, individual spatialized audio stream 276 based upon the spatial, avatar, and scene information signals 244 (e.g., combined at audio sinks).

As described above with reference to FIGS. 2A and 2B, a plurality of spatialized audio streams 246/276 (or non-spatialized individual audio streams 238) may be combined to produce a combined spatialized audio stream 250 for output at a particular client device 110. Considering the possibly very large number of audio streams available in any particular virtual metaverse place or virtual environment, some implementations provide for prioritization of audio streams. The prioritization of audio streams (sometimes referred to as "subscription" to audio streams) allows for a reduced set of prioritized streams (e.g., as compared to all available streams) to be transformed into spatialized audio streams. This reduced set of streams provides technical benefits and effects including reduced computation cycles for generating a combined spatialized audio stream, reduced system resource usage, energy savings, and reduced bandwidth usage.

Hereinafter, prioritization of spatialized audio streams, utilizing the spatialized audio API 106 and available avatar and scene data, is described more fully with reference to FIG. 3.

FIG. 3 is a diagram of an example network environment 300 (e.g., a subset of the network environment 100) for prioritizing spatialized audio streams in a virtual metaverse, in accordance with some implementations. Network environment 300 is provided for illustration. In some implementations, the network environment 300 may include the same, fewer, more, or different elements configured in the same or different manner as that shown in FIG. 3.

As shown in FIG. 3, the media server 202 and client device 110 may be in communication (e.g., over network 122, not illustrated) such that a published audio stream 330 is received from the client device 110, and a set of prioritized audio streams 350 is provided for transformation, combination, and output at the client device 110. It is noted that in some implementations, the prioritized audio streams 350 may be transformed and combined at the online experience platform 102 rather than the client device 110. All such modifications are within the scope of this disclosure.

The client device 110, in addition to those components illustrated in FIGS. 1 & 2A-2B, may include a real-time communication module 302 as well as subscription logic 312. The media server 202, in addition to those components illustrated in FIGS. 1 & 2A-2B, may include a real-time communication module 306, a subscription exchange component 304, and a subscription prioritizer 210.

The real-time communication modules 302/306 may be software components or instances of a real-time communication server, instantiated at the client device 110 and media server 202, respectively. In at least one implementation, the real-time communication modules 302/306 are instances of a WebRTC server implemented according to an exposed WebRTC API (not illustrated). The real-time communication modules 302/306 are configured to pass a published stream 330 from each connected client device and a set of prioritized audio streams 350 to each connected client device.

The subscription exchange component 304 is a software component configured to receive an estimate of at least a portion of a head-related transfer function (HRTF) and/or Baum-Welch (BW) hidden markov model 332/333 from the real-time communication modules 306/302, and to prioritize a set of audio streams into the set 331/351 for output to the client device.

The subscription prioritizer 310 retrieves appropriate and/or relevant spatial parameters 336 from the data model 206 and a number of subscription requests 334 from the spatialized audio API 106. Using the spatial parameters and subscription requests, the subscription prioritizer prioritizes available audio streams into the prioritized set 350. The prioritization can be based on a number of factors, including, for example, proximity of avatars in the metaverse place, velocity of avatars in the metaverse place, direction of avatars in the metaverse place, virtual objects in proximity to avatars within the metaverse place, capabilities of the user device, bandwidth availability, number of connections to the media server 202, overall number of users using spatialized audio, and/or user preferences of the user associated with the client device 110. Additional factors can include available bandwidth (e.g., between the media server 202 and the client device 110), available processing capability (e.g., of the media server 202, client device 110, and/or a combination), available memory (e.g., of the media server 202, client device 110, and/or a combination), and other factors.

The subscription requests are based on subscription logic 312 configured to issue individual subscription requests 338 based on spatial parameters 340 with respect to a particular avatar of a particular user. In this manner, each individual client device issues a different subscription request 338 based on its associated avatar and spatial parameters 340 and other factors 342 that may include, for example, HRTF parameters, BW hidden markov model parameters, and/or VAD parameters.

As described above, a set of prioritized streams may be based on a plurality of spatial parameters related to avatars, items, objects, and other features of a metaverse place, as well as computational resources, storage resources, bandwidth resources, and other resources. Hereinafter, examples of aspects related to spatialized audio are provided with reference to FIGS. 4 & 5.

Figure 4:
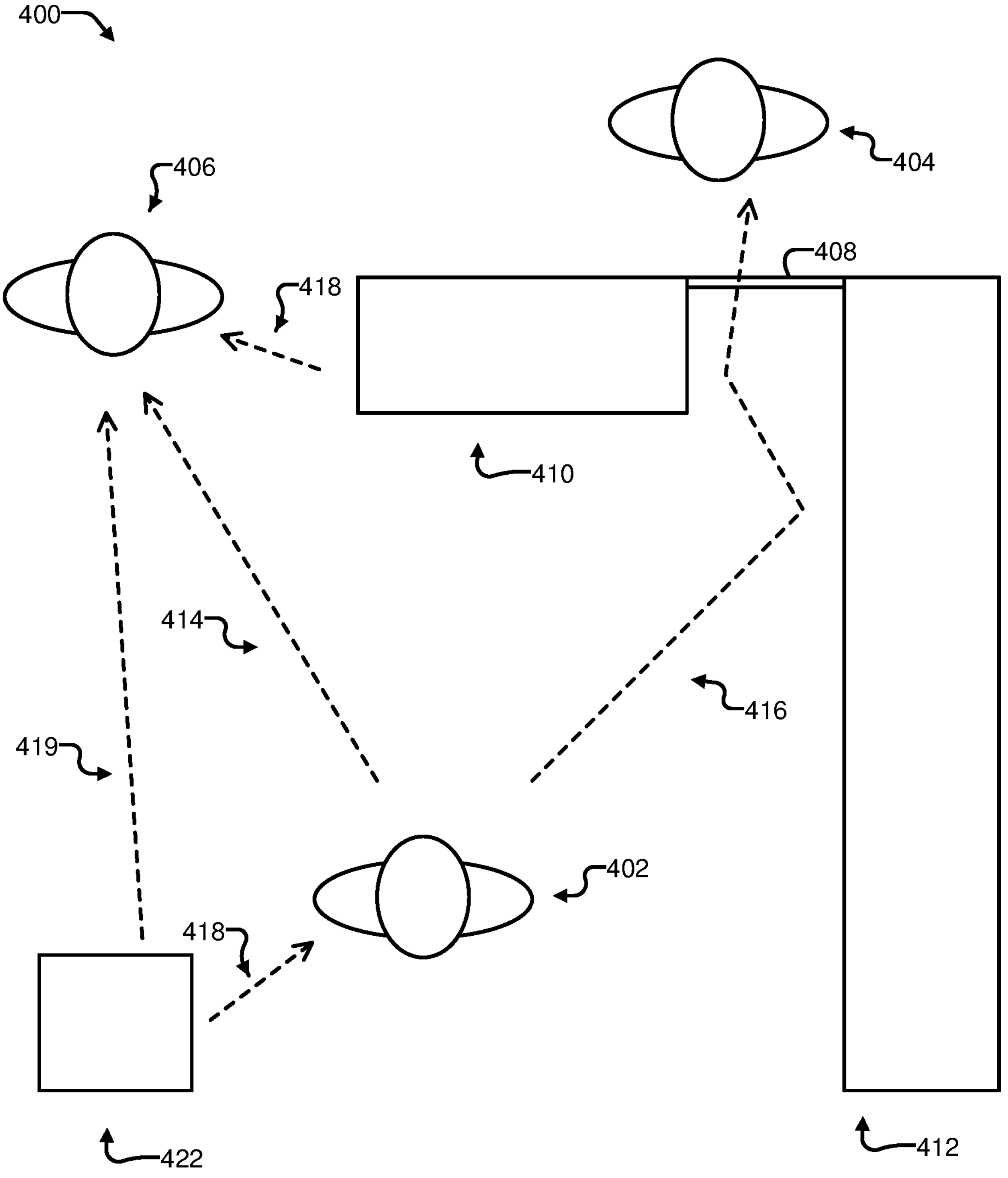
FIG. 4 is a diagram showing an example three-dimensional metaverse place within a virtual experience, in accordance with some implementations.
Figure 5:
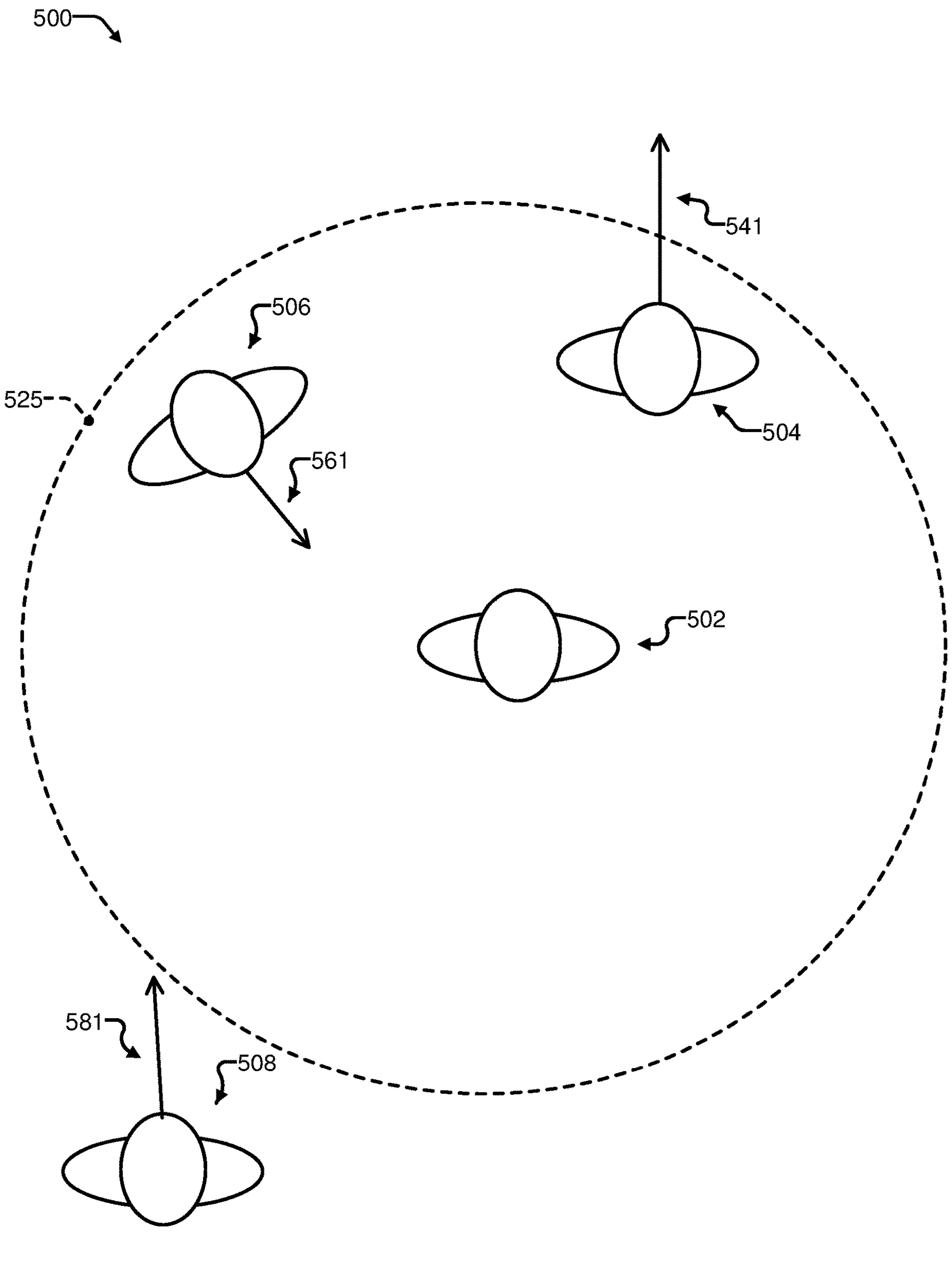
FIG. 5 is a diagram showing an example three-dimensional metaverse place within a virtual experience, in accordance with some implementations.

FIGS. 4 & 5: Examples of Spatialized Audio in a Metaverse Place

FIGS. 4 and 5 are diagrams showing an example virtual environment, such as a metaverse place 400 and a metaverse place 500, within an online virtual experience in accordance with some implementations. The metaverse place 400 includes a first avatar 402, a second avatar 404, and a third avatar 406. The avatars (402-406) can include avatars controlled by a respective user and/or avatars under automatic control of the online experience platform 102 (e.g., computer generated characters).

In addition to avatars 402-406, the metaverse place 400 includes a first virtual object 408, a second virtual object 410, a third virtual object 412, and a fourth virtual object 422. The virtual objects can represent, among other things, buildings, components of buildings (e.g., walls, windows, doors, etc.), bodies of water (e.g., ponds, rivers, lakes, oceans, etc.), furniture, machines, vehicles, plants, animals, etc. The virtual objects (408-412) can include associated data or metadata that corresponds to one or more object characteristics such as material type (e.g., metal, wood, cloth, stone, etc.), object location within the metaverse place 400, object size, object shape, or object sound characteristics (e.g., ambient sound object makes, how often sound is made, volume of sound, etc.).

The object sound characteristics can be based on object type, object size, object shape, or object location. For example, an object representing a full grown large dog may have a sound characteristic that is typical of a full grown dog (object type) that is large (object size) and is located at a given position relative to a character (object location). The sound characteristics can include an ambient sound the object makes (e.g., barking sound) that can be provided by a sound file (e.g., computer generated sound or recorded sound). Further, the sound characteristics can include a frequency that the object makes sound (e.g., how often the dog barks) and a volume of the ambient sound (e.g., how loud the dog bark is at a given distance). The volume of the ambient sound of the object can subsequently be modified as part of the audio spatialization process (e.g., the dog bark can be made louder for a dog that is close to the character and can be made quieter for a dog that is further away from the character).

In the example shown in FIG. 4, the objects can include furniture or parts of a building. For example, virtual object 408 can be a doorway or a virtual border between metaverse places. Virtual object 410 and virtual object 412 can be walls. Virtual object 422 may be a small table or other virtual furniture.

Avatar 402 can be speaking and emitting simulated sound as shown by sound paths 414 and 416. The voice of avatar 402 along sound path 414 is coming from the left of avatar 406 and sound path 416 is coming from the right of avatar 404 through the virtual doorway 408. The path of the sound between avatar 402 and avatar 406 is generally direct, while the path of the sound from avatar 402 to avatar 404 is partially reflected off of the walls 210 and 412 as shown by sound path 416.

Further, ambient sound can be emitted by the table 422. For example, the table could include a speaker or other object on the table that is emitting sound. The ambient sound is shown by sound paths 418 & 419. In some implementations, ambient sounds may include sounds such as wind, rain, music, machinery, animals, item movements, footsteps, etc. Ambient sounds may also include sounds emanating from objects (e.g. a car) that may be stationary or moving around the environment. Ambient sounds may also include sounds created by other avatars moving or interacting with the environment 400 and/or objects within the environment 400.

In operation, an implementation of the audio spatialization techniques described herein could perform one or more of the following operations based on the example metaverse place shown in FIG. 4: 1) spatialization of the voice communications of an avatar (e.g., avatar 402) based on the position of a respective receiving avatar (e.g., 404 or 406) with respect to the avatar speaking; 2) audio spatialization of the voice communications based on any objects within the virtual environment (e.g., 408, 410, 412, or 422); and 3) audio spatialization of ambient sounds (e.g., sound emitted by object 410) within the virtual environment.

Turning now to FIG. 5, an overhead view of metaverse place 500 is illustrated. As shown, the simplified schematic of avatars 502, 504, 506, and 508 include a distance radius 525 measured with regard to avatar 502. In this example, avatar 502 may represent a user that requests spatialized audio, and the distance radius 525 may be a parameter or setting used in prioritization of audio streams.

As further shown, avatar position and velocity data 541, 561, and 581 is represented by arrows emanating from respective avatars. In this example, a user device associated with avatar 502 may receive prioritized audio streams associated with avatars 504 and 506, as well as ambient sounds associated with any objects or non-player items within the radius 525. However, data associated with avatar 508 may also be readied to be prioritized should avatar 508 continue to approach the radius 525 as shown by arrow 581. Alternatively, if computational resources permit or if other parameters permit, the data associated with avatar 508 may also be included in the prioritized audio streams until resources or other prioritization parameters change (e.g., additional avatars approach the avatar 502, computational resource usage increases beyond a threshold, additional audio streams such as background audio are prioritized higher, etc.)

In this manner, a subset of available audio streams is prioritized such that computing resources are reduced while rich, immersive audio is still provided effectively to client devices.

Hereinafter, a more detailed discussion of creation of spatialized audio streams, as well as prioritization of audio streams, is provided with reference to FIGS. 6 and 7.

Figure 6:
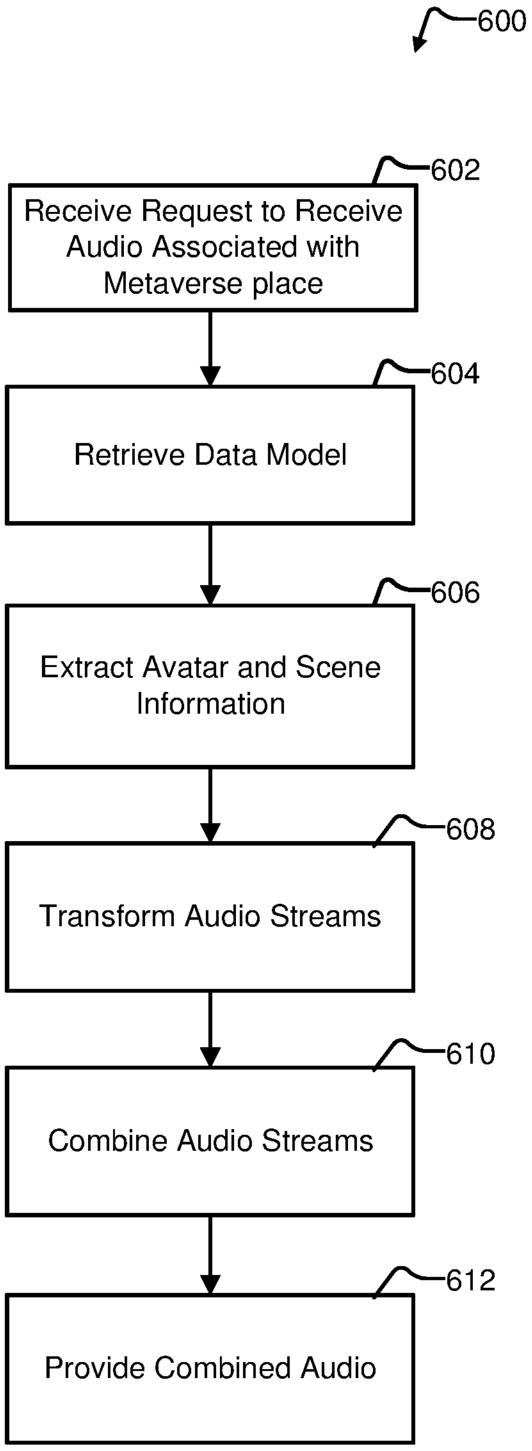
FIG. 6 is a flowchart of an example method to provide spatialized audio chat in a virtual metaverse, in accordance with some implementations.

FIG. 6: Example Method to Create Spatialized Audio Streams

FIG. 6 is a flowchart of an example method 600 to create spatialized audio in a metaverse place, in accordance with some implementations. In some implementations, method 600 can be implemented, for example, on a server system, e.g., online experience platform 102 as shown in FIG. 1. In some implementations, some or all of the method 600 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. Method 600 may begin at block 602.

At block 602, a request to receive audio associated with a metaverse place of the virtual metaverse may be received (e.g., from a first user of a plurality of users). For example, a client device 110 (also referred to as user device) may be associated with a first user. The first user is associated with a first avatar. Furthermore, the plurality of users can be associated with a plurality of avatars in the metaverse place (e.g., other avatars engaging with the metaverse place). Block 602 is followed by block 604.

At block 604, a data model associated with the metaverse place is retrieved. For example, the data model 206 may be stored at the data store 108. The data model can include one or more spatial parameters representative of a group (e.g., one or more) of physical laws that apply to the metaverse place. These physical laws can be exaggerated (as compared to physical laws as applicable on the earth) to increase a spatial effect, or may be attenuated to only slightly implement a spatial effect. The parameters and underlying physical laws of sound propagation may be adjusted and/or altered through the spatialized audio API 106, described above. Block 604 is followed by block 606.

At block 606, avatar information and scene information is extracted from the data model responsive to the request. For example, the request may be associated with a particular client device, and therefore, a particular avatar. Thus, the extracted avatar information includes one or more of: position, velocity, or direction of the particular avatar, and of the plurality of avatars in proximity to the particular avatar in the metaverse place. Similarly, the scene information includes one or more of: occlusions, reverberations, virtual objects, non-player objects, openings, orifices, reflective surfaces, virtual ceilings, virtual floors, and/or virtual walls in virtual proximity to the particular avatar. Block 606 is followed by block 608.

At block 608, respective audio streams received from each user of the plurality of users are transformed, using the extracted spatial parameters. The transformation is based on the avatar information and the scene information. The transforming can include modifying one or more audio characteristics to create spatialized audio streams. For example, attenuation based on a distance decay parameter to attenuate audio based on distance between avatars defined in the data model may be used to alter audio characteristics. Similarly, rolling in or out of audio (e.g., using a "fading" or "rolling" effect) may be implemented to alter audio characteristics. Additionally, increases in volume, decreases in volume, Doppler shifts, reverberations, or reflections may be provided, and/or other characteristics may be altered. In this manner, the transforming outputs spatialized audio streams for each individual avatar and/or virtual object/item within the metaverse place. Block 608 is followed by block 610.

At block 610, the spatialized audio streams are combined to create a combined spatialized audio stream. The combining may be performed at the online experience platform 102, at the client device 110/116, and/or through a combination of the online experience platform and client devices. The combining may be performed for only a set of prioritized audio streams in some implementations. In other implementations, a subset of available audio streams is transformed based on proximity or a threshold distance to an avatar within a metaverse place. Other variations and limitations on the number of audio streams that are transformed are also possible, and such variations are within the scope of this disclosure.

According to at least one implementation, a stream of background audio is also combined with the spatialized audio streams to create the combined spatialized audio stream. For example, a background or "special" stream that mixes a number of participants into background noise/chatter may provide a more realistic experience. For example, in a room with 50 people talking, an avatar may be having a conversation with several avatars within close proximity. While audio from the proximal participants may be clearest, there is also background chatter around the avatar (e.g., pure silence wouldn't be realistic). Accordingly, a background stream may be pre-mixed to include general background chatter from the remaining 50 avatars in a relatively streamlined manner (e.g., a flat background stream from all participants, to be used by the combined streams to all participants). In this manner, the background audio can be generated based upon one or more of audio received from other users distinct from the first user, audio generated based on movement of avatars within the metaverse place, and/or the general or "special" background stream. Block 610 is followed by block 612.

At block 612, the combined spatialized audio stream is provided to the user device for output through an audio output device connected thereto, for example, a set of speakers or headphones. In some implementations, the spatialized audio stream may be provided via audio output devices of a virtual reality headset, an augmented reality headset, a head-mounted device, or the like.

Blocks 602-612 can be performed (or repeated) in a different order than described above and/or one or more blocks can be omitted. For example, data extraction (blocks 604-606) may be performed independently of audio transformation and combination (blocks 608-612). Further, receiving requests, extracting relevant data, and transforming audio may be performed in parallel, or by different components, in some implementations.

Hereinafter, a more detailed discussion of stream prioritization is provided with reference to FIG. 7.

Figure 7:
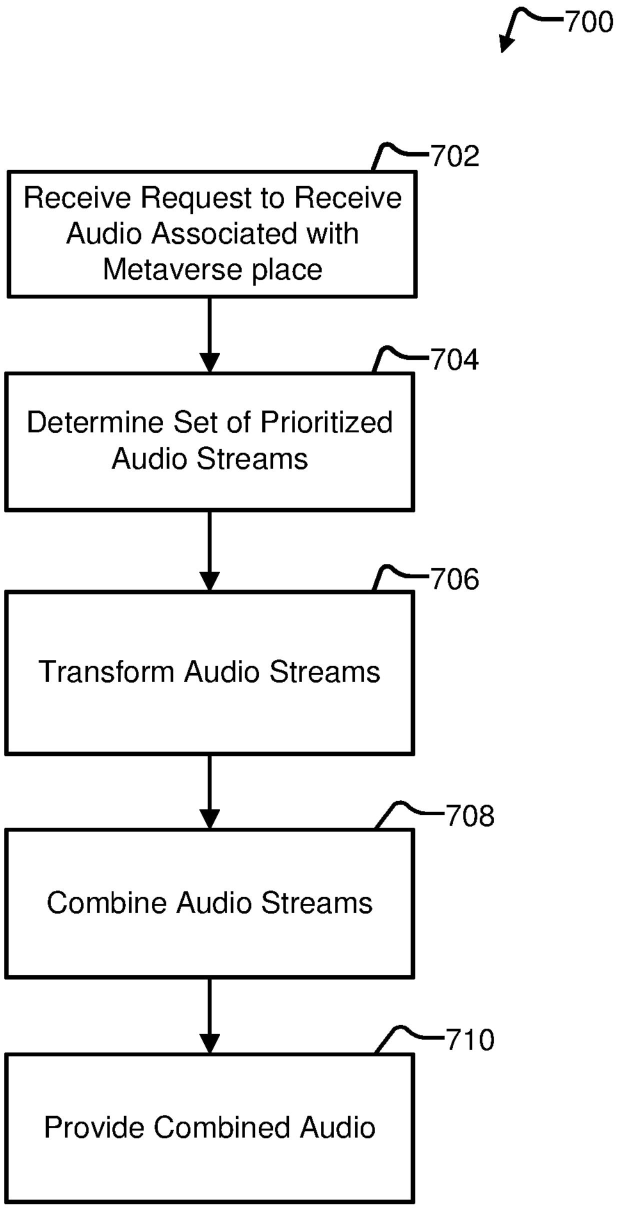
FIG. 7 is a flowchart of an example method to prioritize spatialized audio streams in a virtual metaverse, in accordance with some implementations.

FIG. 7: Example Method to Prioritize Spatialized Audio Streams

FIG. 7 is a flowchart of an example method 700 to provide content to users based on classification, in accordance with some implementations. In some implementations, method 700 can be implemented, for example, on a server system, e.g., online experience platform 102 as shown in FIG. 1. In some implementations, some or all of the method 700 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. Method 700 may begin at block 702.

At block 702, a request to receive audio associated with a metaverse place of the virtual metaverse may be received (e.g., from a first user of a plurality of users). For example, a client device 110 may be associated with a first user. The first user is associated with a first avatar. Furthermore, the plurality of users can be associated with a plurality of avatars in the metaverse place (e.g., avatars engaging with the metaverse place). Block 702 is followed by block 704.

At block 704, a set of prioritized audio streams is determined for the first user. The set of prioritized audio streams is a ranked subset of all audio streams received from each user of the plurality of users within the metaverse place, as well as all other audio streams (e.g., ambient sounds, non-player character/item sounds, etc.). The prioritizing may be based on, for example, a threshold distance and/or threshold radius (e.g., as illustrated in FIG. 5).

The prioritizing may also be based on: proximity of avatars in the metaverse place, velocity of avatars in the metaverse place, direction of avatars in the metaverse place, virtual objects in proximity to avatars within the metaverse place, capabilities of the user device, or user preferences of the first user. For example, the prioritizing may take into consideration avatars moving towards a target avatar, avatars facing a target avatar, and other similar prioritization parameters.

The prioritizing may also be based on processing resources and/or capabilities of the client device. For example, the prioritizing may take into consideration memory usage, disk usage, bandwidth availability, processor usage, and other resource usage to determine if sufficient resources exist to handle a particular number of spatialized audio streams. The prioritization may then prioritize streams such that the particular number of streams are prioritized to avoid conflicts or utilization of further resources beyond a threshold.

The prioritizing may also be based on processing resources and/or capabilities of the media server. For example, the prioritizing may take into consideration memory usage, storage usage, bandwidth availability, processor usage, number of active connections, number of inactive connections, total number of users, and other resource usage to determine if sufficient resources exist to handle a particular number of spatialized audio streams. The prioritization may then prioritize streams such that the particular number of streams are prioritized to avoid conflicts or utilization of further resources beyond a threshold.

The prioritizing may also be based on processing resources and/or capabilities of the online experience platform. For example, the prioritizing may take into consideration memory usage, storage usage, bandwidth availability, processor usage, number of active connections, number of inactive connections, total number of users, number of active online experiences, and other resource usage to determine if sufficient resources exist to handle a particular number of spatialized audio streams. The prioritization may then prioritize streams such that the particular number of streams are prioritized to avoid conflicts or utilization of further resources beyond a threshold.

Other variations on the basis for prioritizing are also possible, and are within the scope of this disclosure. Block 704 is followed by block 706.

At block 706, respective audio streams of the prioritized audio streams are transformed, using the extracted spatial parameters. The transformation is based on the avatar information and the scene information. The transforming can include modifying one or more audio characteristics to create spatialized audio streams. For example, attenuation based on a distance decay parameter to attenuate audio based on distance between avatars defined in the data model may be used to alter audio characteristics. Similarly, rolling in or out of audio may be implemented to alter audio characteristics. Additionally, increases in volume, decreases in volume, Doppler shifts, reverberations, reflections, and other characteristics may be altered. In this manner, the transforming outputs spatialized audio streams for each individual avatar and/or virtual object/item that is associated with a prioritized audio stream. Block 706 is followed by block 708.

At block 708, the spatialized audio streams are combined to create a combined spatialized audio stream. The combining may be performed at the online experience platform 102, at the client device 110/116, and/or through a combination of the online experience platform and client devices. As noted above, special or background audio streams may also be combined to provide ambient and/or background audio to the spatialized audio output. The combining may be performed for only the set of prioritized audio streams. Block 708 is followed by block 710.

At block 710, the combined spatialized audio stream is provided to the user device for output through an audio output device connected thereto, for example, a set of speakers or headphones.

Blocks 702-710 can be performed (or repeated) in a different order than described above and/or one or more blocks can be omitted. Methods 600 and/or 700 can be performed on a server (e.g., 102) and/or a client device (e.g., 110 or 116). Furthermore, portions of the methods 600 and 700 may be combined and performed in sequence or in parallel, according to any desired implementation.

As described above, systems, methods, and computer-readable media may provide spatialized audio in virtual experiences. Through provision of a robust spatialized audio API, developers may use spatialized audio for virtually any virtual experience they create. The immersive qualities of a typical virtual experience bolstered with spatialized audio APIs provide a rich user experience, increase user engagement, provide intuitive feedback (e.g., through audio location), and substantially reduce the complexity of implementing spatialized audio.

Hereinafter, a more detailed description of various computing devices that may be used to implement different devices illustrated in FIGS. 1-3 is provided with reference to FIG. 8.

Figure 8:
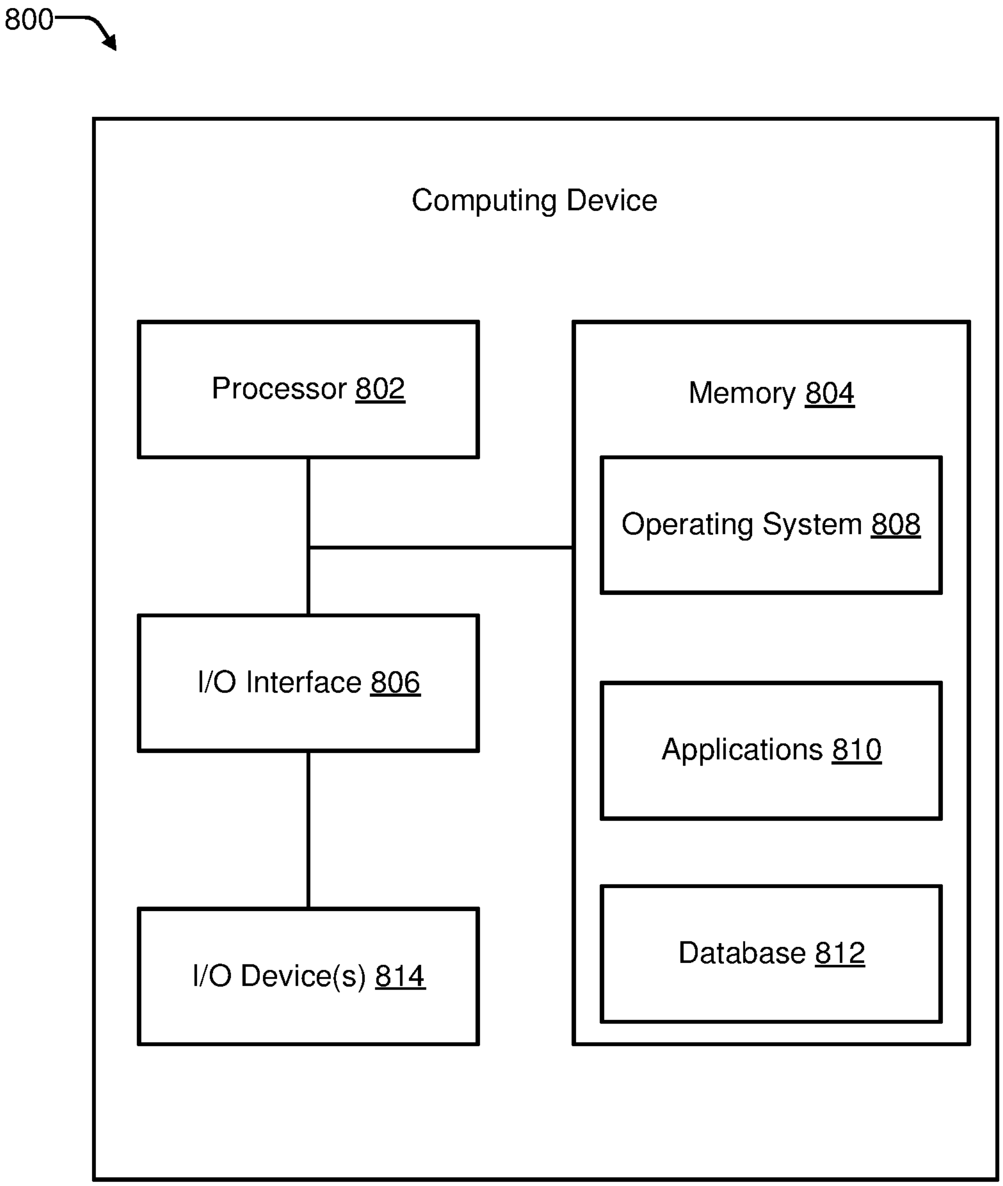
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, and/or 116 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, applications 810 and associated data 812. In some implementations, the applications 810 can include instructions that enable processor 802 to perform the functions described herein, e.g., some or all of the methods of FIGS. 6 and 7.

For example, memory 804 can include software instructions for prioritizing and/or providing spatialized audio within an online experience platform (e.g., 102) or metaverse place. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online experience platform 102 is described as performing operations as described in some implementations herein, any suitable component or combination of components of online experience platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of spatialized audio in a virtual metaverse, comprising:

receiving a request to receive audio associated with a metaverse place of the virtual metaverse from a first user of a plurality of users, wherein the first user is associated with a user device, and wherein each user of the plurality of users is associated with a respective avatar of a plurality of avatars in the metaverse place;

retrieving a data model associated with the metaverse place, wherein the data model includes one or more spatial parameters representative of one or more physical laws that apply to the metaverse place;

extracting avatar information and scene information from the data model, wherein the avatar information includes one or more of: position, velocity, or direction of the plurality of avatars in the metaverse place including a first avatar associated with the first user, and wherein the scene information includes one or more of: occlusions, reverberations, or virtual walls in virtual proximity to the first avatar in the metaverse place;

transforming respective audio streams received from each user of the plurality of users based on the avatar information and the scene information, and one or more audio characteristics of at least one of the respective audio streams based on the one or more spatial parameters to create spatialized audio streams;

determining a set of prioritized audio streams received from each user of the plurality of users, wherein transforming the respective audio streams further comprises transforming the set of prioritized audio streams to create the spatialized audio streams, wherein audio streams associated with avatars that are moving towards a receiving avatar are prioritized over audio streams associated with avatars that are moving away from the receiving avatar;

combining the spatialized audio streams to create a combined spatialized audio stream; and providing the combined spatialized audio stream to the user device.

2. The computer-implemented method of claim 1, wherein the spatial parameters include a distance decay parameter to attenuate audio based on distance between avatars.

3. The computer-implemented method of claim 1, wherein the respective audio stream received from each user of the plurality of users comprises monaural audio received at a microphone device and wherein the combined spatialized audio stream comprises stereo audio.

4. The computer-implemented method of claim 3, wherein the combined spatialized audio stream comprises stereo audio is generated by positioning each user's monaural audio at a location of the respective user's avatar.

5. The computer-implemented method of claim 1, wherein the combined spatialized audio stream comprises spatial audio based on the audio streams received from users of the plurality of users other than the first user and background audio, wherein the background audio is generated based upon one or more of:

audio received from other users distinct from the first user; and audio generated based on movement of avatars within the metaverse place.

6. The computer-implemented method of claim 1, wherein determining the set of prioritized audio streams comprises:

prioritizing audio streams received from each user of the plurality of users based on respective velocities of avatars in the metaverse place.

7. The computer-implemented method of claim 6, wherein determining the set of prioritized audio streams comprises:

prioritizing audio streams received from each user of the plurality of users based on one or more of: proximity of avatars in the metaverse place, direction of avatars in the metaverse place, virtual objects in proximity to avatars within the metaverse place, capabilities of the user device, or user preferences of the first user.

8. The computer-implemented method of claim 1, wherein audio streams associated with avatars that are closer to a receiving avatar are prioritized over audio streams associated with avatars that are further away from the receiving avatar, and wherein audio streams associated with avatars oriented towards a receiving avatar are prioritized over audio streams associated with avatars oriented away from the receiving avatar.

9. A system, comprising:

a memory with instructions stored thereon; and a processing device, coupled to the memory, the processing device configured to access the memory, wherein the instructions when executed by the processing device, cause the processing device to perform operations including:

receiving a request to receive audio associated with a metaverse place of a virtual metaverse from a first user of a plurality of users, wherein the first user is associated with a user device, and wherein each user of the plurality of users is associated with a respective avatar of a plurality of avatars in the metaverse place;

retrieving a data model associated with the metaverse place, wherein the data model includes one or more spatial parameters representative of one or more physical laws that apply to the metaverse place;

extracting avatar information and scene information from the data model, wherein the avatar information includes one or more of: position, velocity, or direction of the plurality of avatars in the metaverse place including a first avatar associated with the first user, and wherein the scene information includes one or more of: occlusions, reverberations, or virtual walls in virtual proximity to the first avatar in the metaverse place;

transforming respective audio streams received from each user of the plurality of users based on the avatar information and the scene information, and one or more audio characteristics of at least one of the respective audio streams based on the one or more spatial parameters to create spatialized audio streams;

determining a set of prioritized audio streams received from each user of the plurality of users, wherein transforming the respective audio streams further comprises transforming the set of prioritized audio streams to create the spatialized audio streams, wherein audio streams associated with avatars that are moving towards a receiving avatar are prioritized over audio streams associated with avatars that are moving away from the receiving avatar;

combining the spatialized audio streams to create a combined spatialized audio stream; and providing the combined spatialized audio stream to the user device.

10. The system of claim 9, wherein the spatial parameters include a distance decay parameter to attenuate audio based on distance between avatars.

11. The system of claim 9, wherein the respective audio stream received from each user of the plurality of users comprises monaural audio received at a microphone device and wherein the combined spatialized audio stream comprises stereo audio.

12. The system of claim 11, wherein the combined spatialized audio stream comprises stereo audio is generated by positioning each user's monaural audio at a location of the respective user's avatar.

13. The system of claim 9, wherein the combined spatialized audio stream comprises spatial audio based on the audio streams received from users of the plurality of users other than the first user and background audio, wherein the background audio is generated based upon one or more of:

audio received from other users distinct from the first user; and audio generated based on movement of avatars within the metaverse place.

14. The system of claim 9, wherein the operations further comprise:

prioritizing audio streams received from each user of the plurality of users based on respective velocities of avatars in the metaverse place.

15. The system of claim 14, wherein determining the set of prioritized audio streams comprises:

prioritizing audio streams received from each user of the plurality of users based on one or more of: proximity of avatars in the metaverse place, direction of avatars in the metaverse place, virtual objects in proximity to avatars within the metaverse place, capabilities of the user device, or user preferences of the first user.

16. The system of claim 15, wherein audio streams associated with avatars that are closer to a receiving avatar are prioritized over audio streams associated with avatars that are further away from the receiving avatar, wherein audio streams associated with avatars oriented towards a receiving avatar are prioritized over audio streams associated with avatars oriented away from the receiving avatar.

17. The system of claim 9, further comprising:

a spatialized audio manager configured to transform the respective audio streams received from each user of the plurality of users; and an audio device override module configured to disable non-spatialized audio at the user device prior to providing the combined spatialized audio stream to the user device.

* * * * *